US012599068B2

(12) United States Patent
Hendriks

(10) Patent No.: US 12,599,068 B2
(45) Date of Patent: Apr. 14, 2026

(54) SOD HARVESTER AND METHOD FOR AUTOMATICALLY ROLLING UP A SLAB OF SOD

(71) Applicant: Erik Henriks Holding B.V., Heythuysen (NL)

(72) Inventor: Emanual Antonius Alphonsus Hendriks, Heythuysen (NL)

(73) Assignee: Erik Hendriks Holding B.V., Heythuysen (NL)

( * ) Notice: Subject to any disclaimer, the term of this patent is extended or adjusted under 35 U.S.C. 154(b) by 441 days.

(21) Appl. No.: 18/268,258

(22) PCT Filed: Jan. 6, 2022

(86) PCT No.: PCT/NL2022/050003
§ 371 (c)(1),
(2) Date: Jun. 19, 2023

(87) PCT Pub. No.: WO2022/149979
PCT Pub. Date: Jul. 14, 2022

(65) Prior Publication Data
US 2024/0049656 A1     Feb. 15, 2024

(30) Foreign Application Priority Data
Jan. 7, 2021     (NL) ..................................... 2027287

(51) Int. Cl.
*A01G 20/12*          (2018.01)
(52) U.S. Cl.
CPC ................................... *A01G 20/12* (2018.02)

(58) Field of Classification Search
CPC ....................................................... A01G 20/12
See application file for complete search history.

(56) References Cited

U.S. PATENT DOCUMENTS

| | | | | |
|---|---|---|---|---|
| 3,235,011 A | * | 2/1966 | Pasinski ................. | A01G 20/12 |
| | | | | 172/19 |
| 3,429,377 A | * | 2/1969 | Nunes, Jr. .............. | A01G 20/12 |
| | | | | 172/19 |
| 3,509,944 A | | 5/1970 | Brouwer et al. | |
| 3,650,330 A | * | 3/1972 | Gieringer ............... | A01G 20/12 |
| | | | | 37/376 |
| 4,832,130 A | | 5/1989 | Brouwer et al. | |

(Continued)

FOREIGN PATENT DOCUMENTS

| | | |
|---|---|---|
| GB | 2238941 A | 6/1991 |
| GB | 2561420 A | 10/2018 |
| JP | 2004-321148 A | 11/2004 |

*Primary Examiner* — Matthew R Buck
(74) *Attorney, Agent, or Firm* — Richard M. Goldberg

(57) ABSTRACT

A sod harvester for harvesting a slab of sod present on a piece of land, includes an arrangement for releasing the slab of sod from the piece of land and a conveyor for conveying the slab of sod in a transport direction towards a roll-up mechanism for automatically rolling up the slab of sod, wherein the roll-up mechanism includes a moving surface that moves in a direction opposite to the transport direction, wherein the conveyor conveys the slab of sod to provide that the leading end of the slab of sod abuts the moving surface, and wherein the conveyor and moving surface are spatially arranged to provide that the slab of sod and the moving surface abut while forming an acute angle.

14 Claims, 5 Drawing Sheets

(56) References Cited

U.S. PATENT DOCUMENTS

| | | | |
|---|---|---|---|
| 7,021,584 B2 * | 4/2006 | Hendriks | A01G 20/15 |
| | | | 242/534 |
| 2013/0092406 A1 * | 4/2013 | Brouwer | A01G 20/15 |
| | | | 172/19 |
| 2020/0305358 A1 * | 10/2020 | Aposhian | A01G 20/15 |

* cited by examiner

SOD HARVESTER AND METHOD FOR AUTOMATICALLY ROLLING UP A SLAB OF SOD

FIELD OF THE INVENTION

The invention in general pertains to a sod harvester for harvesting a slab of sod present on a piece of land, the sod harvester comprising means for releasing the slab of sod from the piece of land and a conveyor for conveying the slab of sod in a transport direction towards a roll-up mechanism for automatically rolling up the slab of sod. The invention also pertains to a dynamic roll-up mechanism for automatically rolling up a slab of sod, and a method for automatically rolling up a slab of sod in a sod harvester.

BACKGROUND OF THE INVENTION

The above described sod harvester is generally known in the art. Sod harvesting for commercial applications typically occurs by cutting (but any other means for releasing slabs could be used, such as a shovel, a (cutting) wire, a spade, or even hand labour, etc.) slabs (strips) of sod from a piece of agricultural land using a tractor-driven or self-propelled sod harvester. The cut slabs are conveyed into the harvester, formed into rolls and stacked for pick up and transportation in bulk. Mechanisms to automatically roll slabs of sod are also generally known in the art. The sod rolls are typically discharged at the rear, upper end of an inclined conveyor. The rolls are preferably discharged at a location convenient for a worker to pick up the rolls of sod and stack them onto a pile, usually on a pallet carried by the sod harvester.

For example, U.S. Pat. No. 3,509,944 (Brouwer) discloses a prior art sod harvester which includes such an inclined conveyor, and in which the rolls of sod are formed adjacent the upper end of the conveyor.

U.S. Pat. No. 4,832,130 (Brouwer) discloses a self-propelled sod harvester. The harvester includes an inclined conveyor, and the conveyor delivers the slabs of sod into a separate roll-forming enclosure. The roll-forming enclosure includes a pair of conveyors disposed generally at right angles to one another for forming the roll. The formed rolls are discharged onto a cart at the end of the harvester which can convey the formed roll to either side of the cart and clear of the harvester for its next pass.

U.S. Pat. No. 7,021,584 (Steiner Turf Equipment) discloses a common method of rolling a slab of sod utilising a roll-up conveyor, which is located at the rear upper end of a transport conveyor. Ahead of the roll-up conveyor, the sod roll is started by catching and turning back the leading edge on a stationary curved piece of expanded metal, typically referred to as a starter gate. The sod continues to roll under a tray that provides sufficient friction to hold the leading edge of the newly started roll generally stationary at the starter gate as the transport conveyor moves the sod in the transport direction (rearward with respect to the direction in which the harvester itself crosses the land). As the non-rolled up part of the slab of sod moves rearward and the rolled-up part grows, it eventually encounters a roll-up conveyor, which is located above the transport conveyor. The roll-up conveyor operates on a parallel plane but moves in a direction opposite and at a slightly slower speed than transport conveyor. This allows the sod roll to finish being rolled in a smaller bundle than would be required if only a tray were used. As the sod roll is completed at the end of the roll-up conveyor, it is ejected rearwardly. The position of the flap (i.e. the upstream end of the slab at the circumference of the roll) can be controlled by a system using an adjustable plate.

The roll-up mechanism using a stationary stopper is commonly used and known from many other references such as GB 2238941 (Van Vuuren) and JP 2004321148 (Kono Kikai). The system however has proven to be mechanically durable and reliable and hence is widely used. However, the reliability of the rolling up action is not 100%, typically around 90-95%. This means that every 1 out of 10 to 20 slabs does not automatically end in a nicely formed roll. This necessitates the presence of a human operator near the roll-up mechanism to quickly remove any faulty (non- or only partially rolled) slabs of sod. Also, in practice this prevents the use of parallel harvesting of multiple slabs (two or more) at the same time since one operator cannot keep up with the pace of removing faulty slabs at the corresponding increased unreliability. Two or more operators is an option, but this increases the costs for harvesting the sods significantly. That is why in practice, all sod harvesters remove slabs of sod in a consecutive order, i.e. one slab at a time.

OBJECT OF THE INVENTION

It is an object of the invention to provide a roll up mechanism for use in a sod harvester that has an increased roll-up reliability, leading to less than 5% of non- or partially rolled up slabs of sod.

SUMMARY OF THE INVENTION

In order to meet the object of the invention, a novel roll-up mechanism for slabs of sod has been devised, wherein this roll-up mechanism comprises a moving surface that moves in a direction opposite to the transport direction, and wherein the conveyor conveys the slab of sod to provide that the leading end of the slab of sod abuts the moving surface, and wherein the conveyor and moving surface are spatially arranged to provide that the slab of sod and the moving surface abut while forming an acute angle. In this novel arrangement, the rolling up action is initiated by the moving surface grabbing the leading edge of the slab of sod such that the leading edge is temporarily moved in conjunction with the moving surface in the opposite direction. This is made possible by making sure the moving surface and slab of sod form an acute angle. This way, there is an open space that allows the leading edge of the slab of sod, which after it is grabbed by the moving surface is no longer supported by the conveyor at the site where the sod abuts the moving surface, to be actively bend "backwardly" over the slab itself, whereafter the leading end is automatically released from the moving surface and moves towards the slab of sod to start the rolling up of the slab of sod. This way the rolling up is initiated, creating a rolled up part of the slab of sod in the area where the moving surface and the slab of sod form the acute angle. The rolling up is continued by maintaining the conveying action of the non-rolled up part of the slab of sod in the transport direction, while the moving surface keeps moving a part of the downstream end of the, now partially rolled up, slab of sod in conjunction with the moving surface in the opposite direction. This way the moving surface, in cooperation with the conveyor, actively rolls up the slab of sod at a speed corresponding to the net transport speed of the slab of sod, until the slab of sod is in essence (apart from a potentially "loose" flap) completely rolled up.

It has appeared that by using the above dynamic roll-up mechanism, instead of the static "starter gate" mechanism as known form the art, the reliability can be increased to become higher than 95%, up to even (about) 100%. It is believed that this is mainly due to the fact that the novel roll-up mechanism does not include a stopper-starter gate but continuous moving parts. In addition, after having tested the novel roll-up mechanism, a few additional advantages appeared, that even imply further favourable use of the current mechanism. Due to the continuous moving action, not needing to stop and start every slab of sod, there is no longer a need of having an intermediate open space between every slab of sod. This way, the harvesting speed can be increased a few percent. More importantly, due to the non-presence of a stop and start action, the risk of a slab being torn is (almost) zero, whereas in the prior art system, this is a considerable risk. Thus, not only can the reliability of the rolling up action itself be increased, at the same time the sod harvesting speed can be increased, while lowering the risk for damaging the sod, in particular by inducing a (full) tear. And even if a slab would be torn completely preceding the rolling up action, this would still lead to a proper formation of a sod roll. With a prior art starter gate system this is not possible: every torn slab leads to an interruption of the harvesting action and a lost roll.

It was applicant's recognition that due to the substantially increased reliability of the rolling up action itself, and the substantially lower risk of tearing a harvested slab of sod, the current mechanism allows to implement two or even more parallel harvesting actions in one sod harvester. In other words, instead of harvesting one row of consecutive slabs from the piece of land, 2, 3 or even 4 (or more) rows of slabs of sods can be released form the land in parallel and processed in the harvester at the same time. This increases the harvesting speed tremendously, while not increasing the burden on necessary operator use (or even completely avoiding the presence of an additional operator at the rear end of the harvester), and thus decreases overall costs per item, i.e. per roll of sod.

The invention did not only lead to a novel sod harvester, but also to a dynamic roll-up mechanism for automatically rolling up a slab of sod for use in a sod harvester, the dynamic roll-up mechanism comprising a conveyor for conveying the slab of sod in a transport direction towards a moving surface that is arranged to move in a direction opposite to the transport direction, wherein the conveyor is spatially arranged with respect to the moving surface such that the conveying of the slab of sod leads to the leading end of the slab of sod to come in an abutting relationship with the moving surface, and such that the slab of sod abuts the moving surface while forming an acute angle therewith.

Also, the invention has led to a novel method for automatically rolling up a slab of sod in a sod harvester, the method comprising conveying the slab of sod in a transport direction towards a moving surface that moves in a direction opposite to the transport direction, wherein the conveyor and the moving surface are spatially arranged such that the leading end of the slab of sod abuts the moving surface while forming an acute angle therewith, wherein the moving surface grabs the leading edge of the slab of sod such that the leading edge is temporarily moved in conjunction with the moving surface in the said opposite direction, whereafter the leading end is automatically released from the moving surface and moves towards the slab of sod to start the rolling up of the slab of sod, thereby creating a rolled up part of the slab of sod and a non-rolled up part of the slab of sod, which rolling up is continued by conveying the non-rolled up part of the slab of sod in the transport direction, while the moving surface keeps moving the rolled up part of the slab of sod in conjunction with the moving surface in the opposite direction until the slab of sod is in essence completely rolled up.

DEFINITIONS

A slab of sod is a strip of grass and the part of the soil beneath it held together by its roots and/or another piece of thin material. Sod is also known as turf. A piece of turf is called a slab of sod as soon as it is being released (cut) from the land and thereafter, up and until it is re-laid onto and re-grown into a remote piece of land.

Automatic means without the need of intervention of a human operator. Automatic does not exclude that an action is operator initiated or stopped.

An acute angle is a sharp angle, i.e. an angle between 0 and 90°.

A first direction being opposite to a second direction means that the first direction and the second direction form an angle between 90 and 270°. At 180°, the two directions are completely opposite. Between 90 to 180°, and 180 to 270°, the directions only have components that are completely opposite (i.e. angled at 180°), these components get bigger as the directions get closer to forming a 180° angle.

A profile on a surface is a part that extends from the basic surface, such as a ripple, a structure of dots, a ribbon or strip etc. A profile is typically added to increase grip on an otherwise smooth surface.

A rubber track is a continuous rubber band, typically driven by two or more wheels and reinforced by wires such as synthetic fibres or metal wires.

FURTHER EMBODIMENTS OF THE INVENTION

In a first embodiment of the sod harvester according to the invention, in which embodiment the conveyor and moving surface are spatially arranged to enclose the slab of sod during roll-up, at the site of roll-up, the transport speed of the conveyor is higher than the speed of the moving surface (for example 10, 15, 20, 25, 30, 35, 40, 45, 50, 55, 60, 65, 70, 80, 90 100% higher or even more). This way, the sod is actively rolled up while being enclosed by the two surfaces and importantly, by having a larger transport speed for the conveyor, there remains a net transport speed of the slab of sod while being actively rolled up by the two surfaces enclosing the end of the slab of sod. This has the advantage that the rolling up does not mean, as in the prior art, that the slab of sod remains stationary during roll up, but maintains a positive transport speed. This increases reliability and overall process speed. Preferably, the conveyor and moving surface enclose the slab of sod at the site of roll-up at opposite sites of the (partially) rolled up slab of sod. This way, the moving surface and conveyor do not cross (which could block the transport of the rolled-up slab of sod) and an open space remains between these elements to allow transport of the slab of sod while being rolled-up in between the conveyor and moving surface. The term "opposite" in this sense thus means that the conveyor and moving surface at the site of roll-up in essence run in parallel, i.e. at an angle of 0°± at maximum 30°, preferably less than 30°, such as 25°, 20°, 15°, 10° or less.

In a further embodiment of the sod harvester according to the invention, the conveyor adjacent the roll-up mechanism is inclined. It was found that in the present acute angle set-up between the sod and the moving surface, an inclined conveyor surface facilitates automatic roll up. This is because the leading end that is initially grabbed by the moving surface is then inherently steered back towards the sod surface and thus rolling up is inherently initiated.

In another embodiment of the sod harvester according to the invention, the conveyor adjacent the roll-up mechanism is inclined upwardly in the transport direction. As described supra, it was found that in the present acute angle set-up between the sod and the moving surface, an inclined conveyor surface facilitates automatic roll up. The spatial arrangement of the conveyor surface being inclined upwardly means that the steering back action of the leading edge after release from the moving surface is initiated merely by the presence of gravity. No other means are necessary to initiate this.

In yet a further embodiment of the sod harvester according to the invention the acute angle is between 10 and 80°. It was found that the open space is in practice too small when the angle is below 10°. This is not a problem for very thin slabs, but for slabs that are more heavy (e.g. heavier grass), an angle above 10° is better. An angle above 80° is doable, but here, for the less heavy slabs there is a risk that not only the leading edge is grabbed by the moving surface for initiating roll-up, but a substantially longer part of the slab, leading to a folded core or the roll instead of a completely rolled up slab. Preferably, the acute angle is between 15 and 60°, such as for example 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58 or 59°. More preferably the acute angle is between 20 and 40°. Most preferably the acute angle is between 25 and 35°, preferably around 30°, i.e. between 28 and 32°.

In yet a further embodiment of the sod harvester according to the invention the moving surface is part of a continuous belt. A continuous belt has the advantage that there is no need for a stopping and returning mechanism, which means that the inherent reliability is increased. Belts can run for many years without any maintenance and faults.

In yet a further embodiment of the sod harvester according to the invention the moving surface is provided with one or more profiles directed towards the slab of sod. The presence of profiles increases the reliability of the grabbing action by the moving surface. The profile is typically macroscopically, such as a ripple or a series of regularly arranged drops visible with the naked human eye, but it may also be that the profile is a microscopic profile such a certain surface roughness. This could for example suffice if the inherent friction coefficient of the surface (without profiles) is already nearly sufficient for a reliable grabbing action.

In still a further embodiment of the sod harvester according to the invention the moving surface is part of a rubber track. Rubber tracks, such as a rubber track produced for a simple snow scooter, are inexpensive, provide excellent grabbing action, require hardly any maintenance and are very durable.

In again a further embodiment of the sod harvester according to the invention the roll up mechanism is provided with a pressure roller to direct the moving surface towards the slab of sod. It was found that the reliability of the rolling up action can be increased, in particular for a moving surface that is part of a belt or band with a low inherent stiffness, by pushing the surface towards the site where the slab of sod abuts the moving surface. This way the interaction and hence grabbing action is even more reliable.

The present invention enables a sod harvester wherein the conveyor and roll up mechanism can convey and roll up at least two parallel slabs of sod (typically 3 or 4) that are harvested at the same time. Due to the increased reliability, now for the first time it has appeared possible in practice to harvest up to 4 slabs of sods (or even more) in parallel at the same time without too much interruptions of the harvesting action due to failures. The need for having a human operator at the machine for removing any faulty rolls or teared slabs from the machine is even (almost) completely gone, depending also on the type of land, grass and quality of the sod. In a further embodiment the roll up mechanism comprises at least two separate moving surfaces, each moving surface corresponding to one slab of sod. This enables the rolling up action of each slab of sod independent of the other slab of sod. This way, reliability can be increased even further if for example the process parameters differ between two parallel lines (for example when the sod quality differs, or when the conveying means, for example due to wear, differ between two parallel lines).

Any of the above embodiments of the sod harvester itself correspond to embodiments of the dynamic roll-up mechanism according to the invention and to embodiments of the method for rolling of slabs of sod according to the invention.

The invention will now be further explained using the following non limiting examples.

DETAILED DESCRIPTION

FIG. 1

Figure 1:
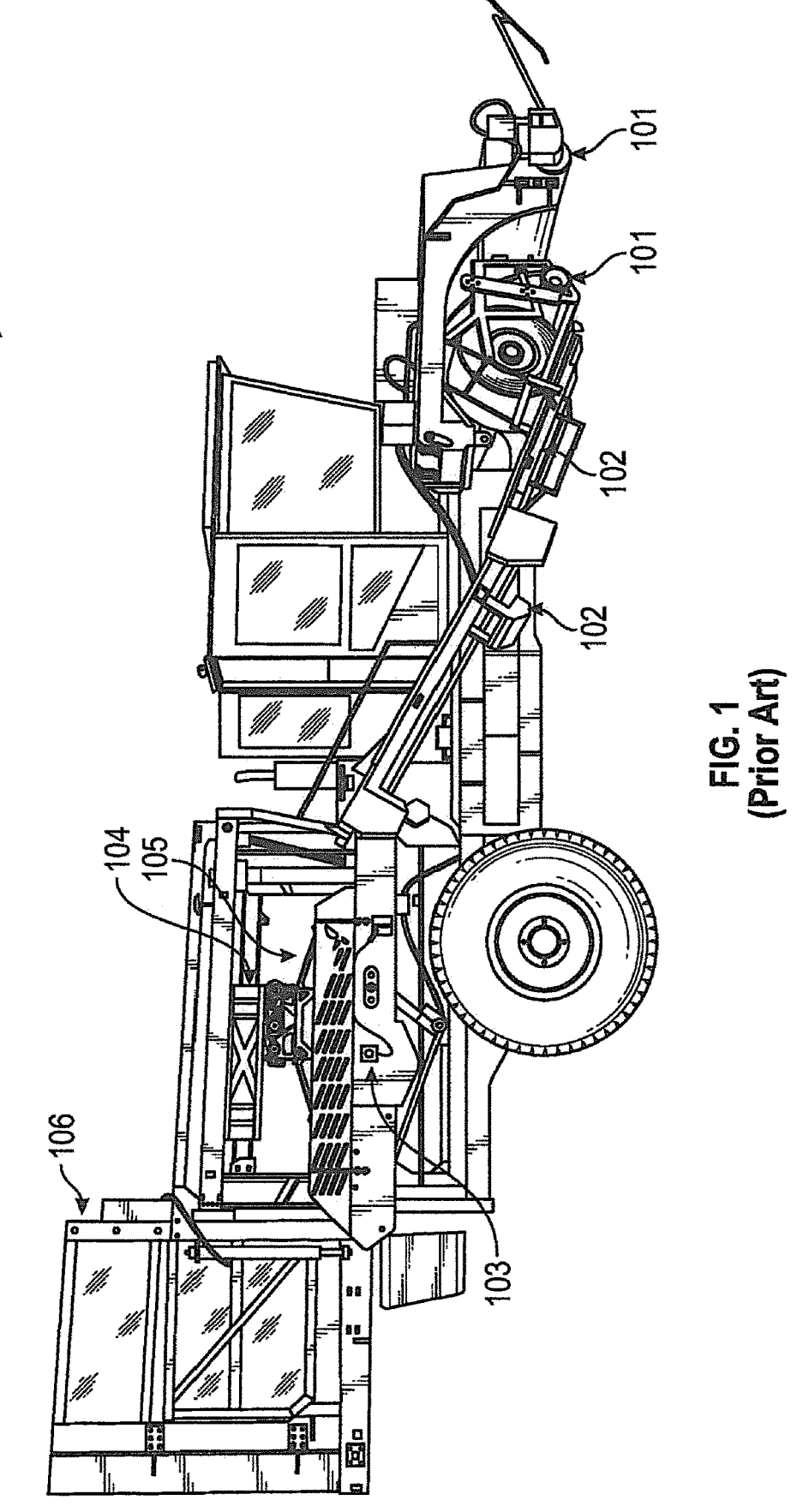
FIG. 1 represents a sod harvester as known from the prior art.
Figure 2:
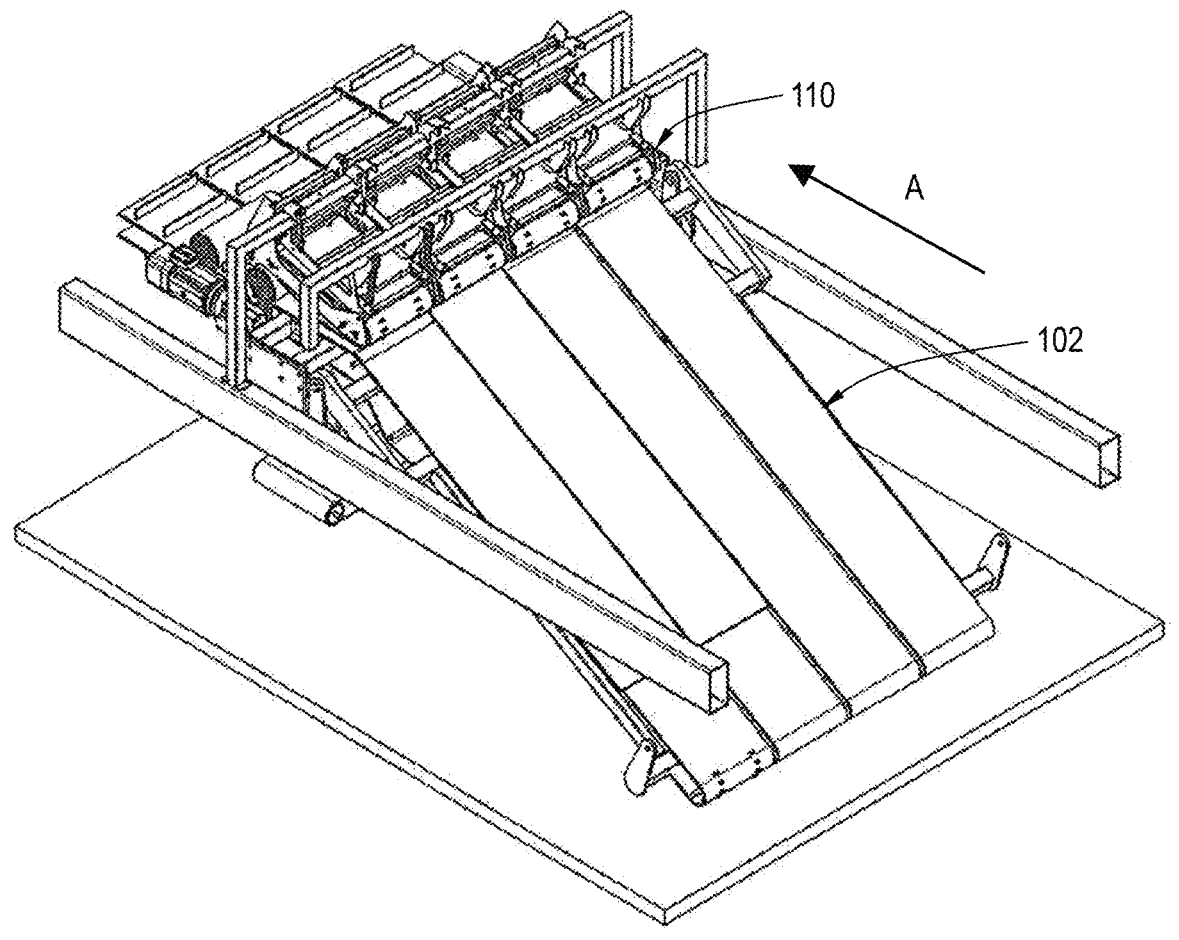
FIG. 2 shows the conveying and roll-up set up for a sod harvester according to the invention.
Figure 3:
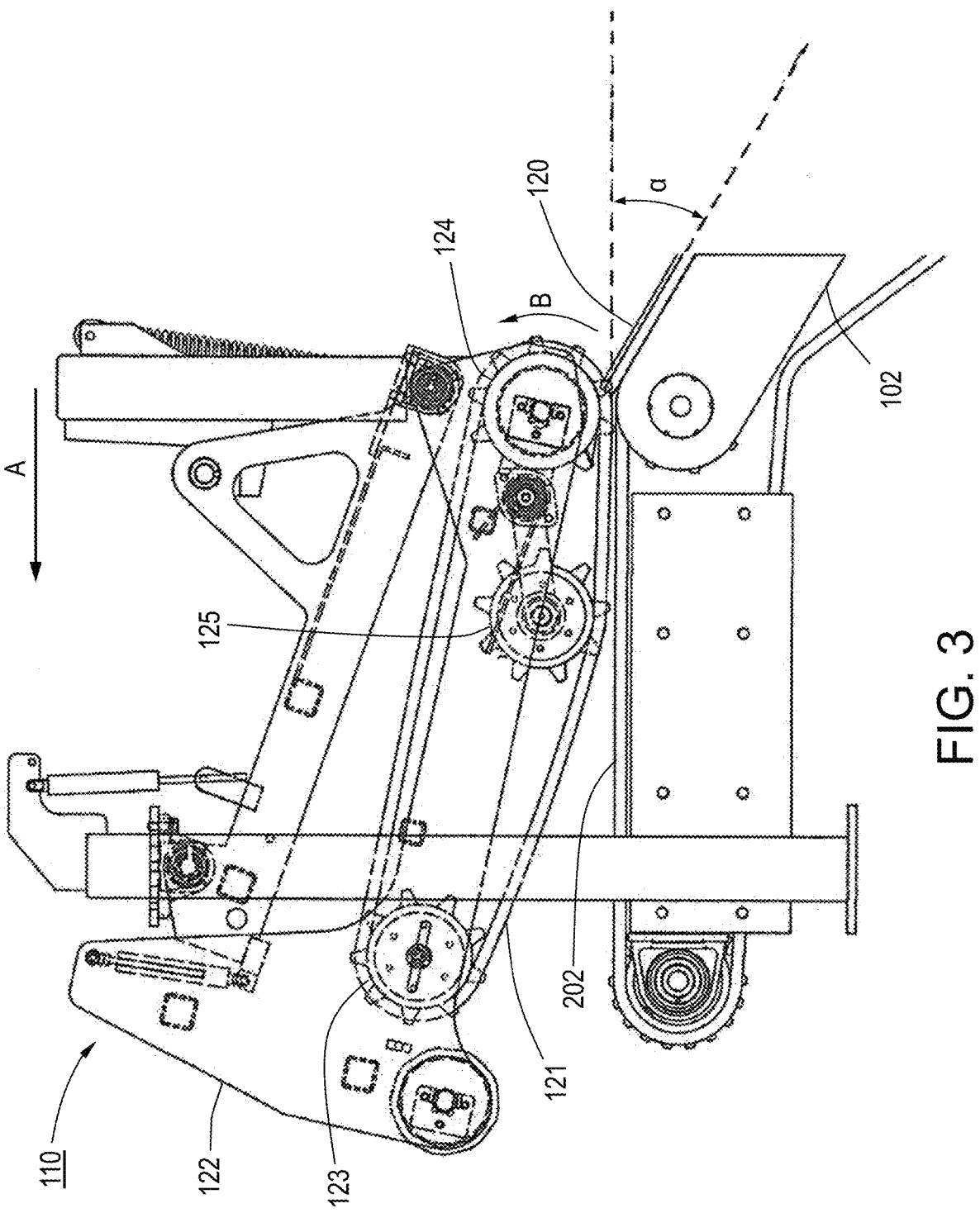
FIG. 3 is a close up view of a dynamic roll-up mechanism according to the invention.
Figure 4:
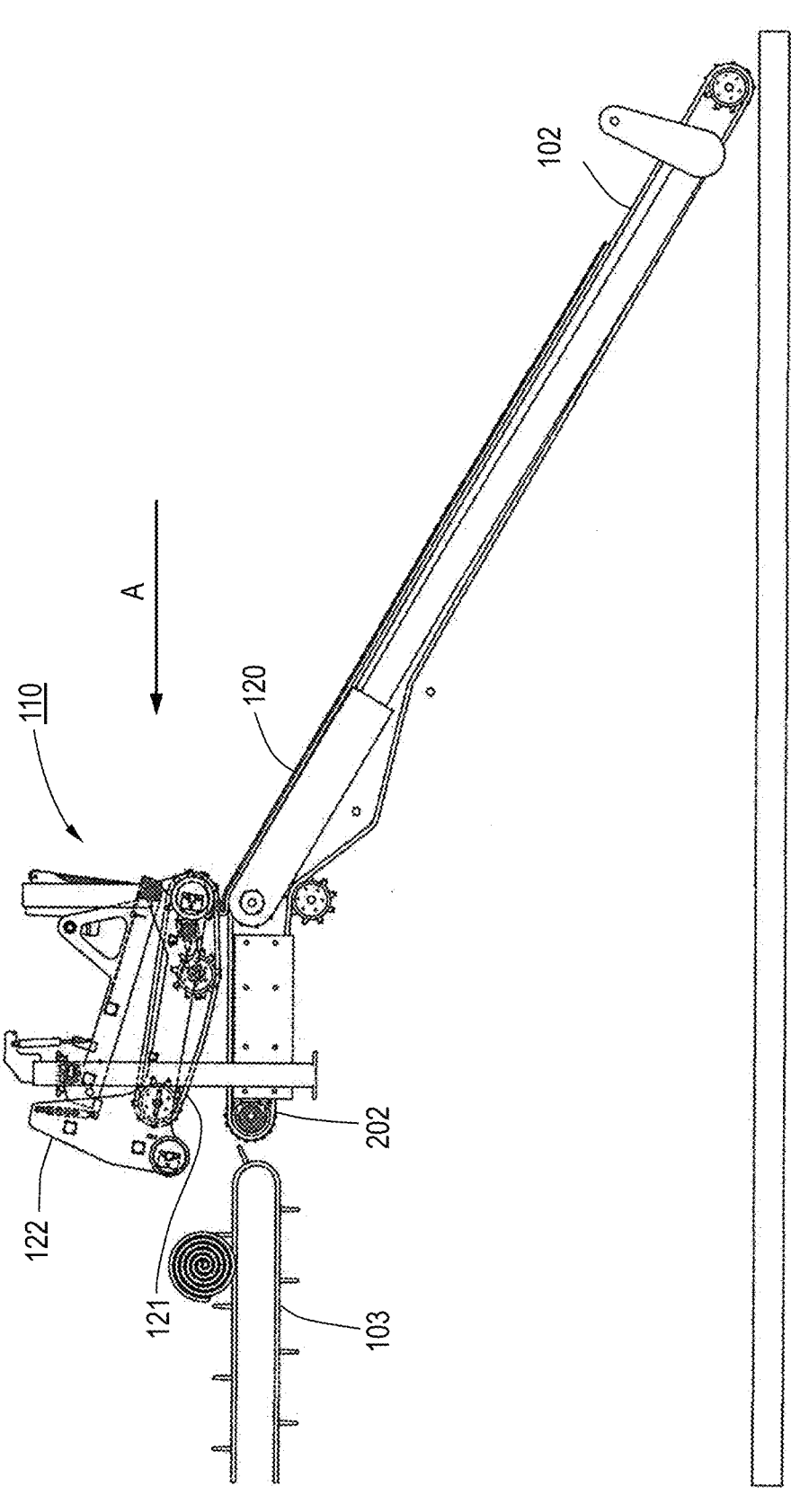
FIG. 4 is a side view of the conveying and roll-up mechanism as shown in FIG. 2, showing a slab of sod positioned with its leading edge in the dynamic roll-up mechanism.
Figure 5:
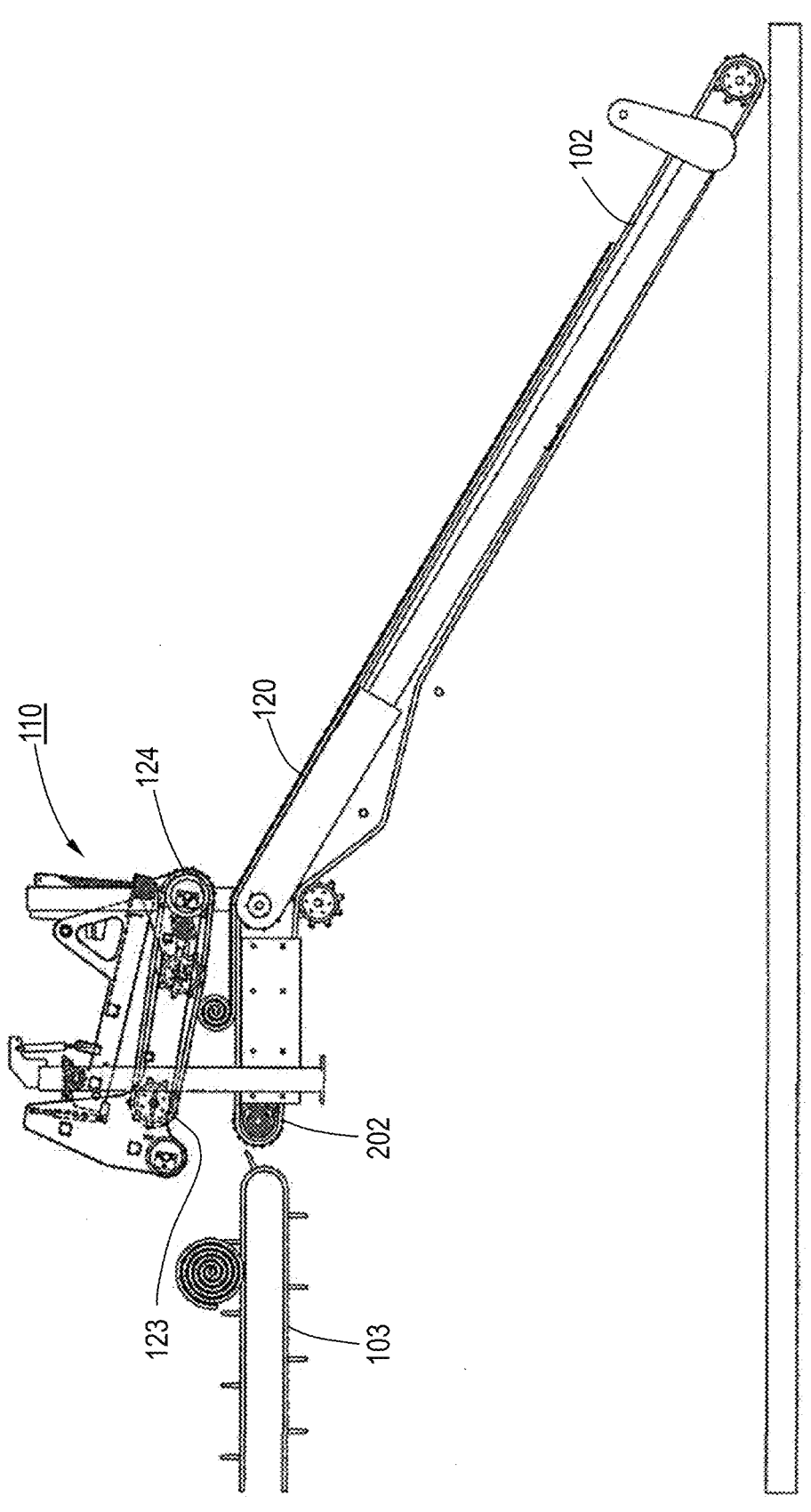
FIG. 5 corresponds to FIG. 4, but the slab of sod being rolled up to for a larger part.

FIG. 1 represents a sod harvester as known from the prior art. A sod (turf grass) is a living organism that must be handled properly to ensure its survival when it is removed from one location and transplanted to another. Sod is generally harvested using large machinery such as sod harvester 100 shown in FIG. 1. Sod harvester 100 is in the form of a self-propelled tractor and includes as a release means for the slabs of sod a cutting head 101 that cuts the slabs of sod from the land, inclined conveyor(s) 102 that elevate the slabs from the ground towards a stacking conveyor 103 (for temporarily stacking the conveyed slabs), a stacking head 105 that is mounted to a support mechanism 104, and a pallet dispenser 106 that is positioned adjacent a pallet support (not visible) on which stacking head 105 stacks slabs that it has removed from stacking conveyor 103. Two general types of harvesters exist: slab harvesters and roll harvesters. A roll harvester forms the slabs of sod into rolls which are then accumulated on the stacking conveyor for pick up. A slab harvester, on the other hand, directly stacks the slabs in their flat form. Prior art sod harvester 100 represents a slab harvester. However, the only principle difference is that a roll harvester (which is also the harvester of the present invention) includes a roll up mechanism downstream of the initial conveyer(s).

FIG. 2 wherein the conveyor conveys the slab of sod to provide that a leading end of the slab of sod abuts the moving surface, and wherein the conveyor and the moving surface are spatially arranged to provide that the slab of sod and the moving surface abut while forming an acute angle, wherein the conveyor and the roll-up mechanism are adapted to convey and roll up at least two parallel slabs of sod that are harvested at the same time.

2. A sod harvester according to claim 1, wherein the conveyor and the moving surface are spatially arranged to enclose the slab of sod during roll-up, and wherein the transport speed of the conveyor is higher than the speed of the moving surface.

3. A sod harvester according to claim 1, wherein the conveyor adjacent the roll-up mechanism is inclined upwardly in the transport direction.

4. A sod harvester according to claim 1, wherein the acute angle is between 10 and 80°.

5. A sod harvester according to claim 1, wherein the acute angle is between 15 and 60°.

6. A sod harvester according to claim 1, wherein the acute angle is between 20 and 40°.

7. A sod harvester according to claim 1, wherein the acute angle is between 25 and 35°.

8. A sod harvester according to claim 7, wherein the acute angle is around 30°.

9. A sod harvester according to claim 1, wherein the moving surface is part of a continuous belt.

10. A sod harvester according to claim 1, wherein the moving surface is provided with one or more profiles directed towards the slab of sod.

11. A sod harvester according to claim 1, wherein the moving surface is part of a rubber track.

12. A sod harvester according to claim 1, wherein the roll up mechanism is provided with a pressure roller to direct the moving surface towards the slab of sod.

13. A sod harvester according to claim 1, wherein the roll up mechanism comprises at least two separate moving surfaces, each moving surface corresponding to one slab of sod.

14. A method for automatically rolling up a slab of sod in a sod harvester, the method comprising the steps of:

conveying the slab of sod in a transport direction with a conveyor towards a moving surface of a roll-up mechanism that moves in a direction opposite to the transport direction, spatially arranging the conveyor and the moving surface such that a leading end of the slab of sod abuts the moving surface while forming an acute angle therewith, grabbing the leading edge of the slab of sod with the moving surface such that the leading edge is temporarily moved in conjunction with the moving surface in said opposite direction, whereby the leading end is automatically released from the moving surface and moves towards the slab of sod to start the rolling up of the slab of sod, thereby creating a rolled up part of the slab of sod and a non-rolled up part of the slab of sod, continuing rolling up the slab of sod by conveying the non-rolled up part of the slab of sod in the transport direction, while the moving surface keeps moving the rolled up part of the slab of sod in conjunction with the moving surface in the opposite direction until the slab of sod is in essence completely rolled up, and the conveyor and the roll-up mechanism convey and roll up at least two parallel slabs of sod that are harvested at the same time.

* * * * *